United States Patent
Yang et al.

(10) Patent No.: US 12,493,744 B2
(45) Date of Patent: Dec. 9, 2025

(54) CONTEXT-BASED KEYPHRASE EXTRACTION FROM INPUT TEXT

(71) Applicant: Ancestry.com Operations Inc., Lehi, UT (US)

(72) Inventors: Yingrui Yang, San Mateo, CA (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 530 days.

(21) Appl. No.: 17/667,320

(22) Filed: Feb. 8, 2022

(65) Prior Publication Data

US 2022/0253604 A1 Aug. 11, 2022

Related U.S. Application Data

(60) Provisional application No. 63/147,494, filed on Feb. 9, 2021.

(51) Int. Cl.
*G06F 17/00* (2019.01)
*G06F 40/284* (2020.01)
*G06F 40/289* (2020.01)
*G06F 40/30* (2020.01)

(52) U.S. Cl.
CPC .......... *G06F 40/289* (2020.01); *G06F 40/284* (2020.01); *G06F 40/30* (2020.01)

(58) Field of Classification Search
CPC ....... G06F 40/284; G06F 40/289; G06F 40/30
USPC .......................................................... 704/9
See application file for complete search history.

(56) References Cited

U.S. PATENT DOCUMENTS

| | | | |
|---|---|---|---|
| 11,650,986 B1* | 5/2023 | Agbemabiese | ... G06F 16/24553 707/737 |
| 2016/0342589 A1* | 11/2016 | Brugger | .................. G06F 16/35 |
| 2019/0266250 A1* | 8/2019 | Toplyn | .................... G10L 15/26 |
| 2020/0394364 A1* | 12/2020 | Venkateshwaran | ... G06F 40/117 |
| 2021/0081613 A1* | 3/2021 | Begun | ..................... G06N 3/088 |
| 2021/0319188 A1* | 10/2021 | Zhou | ....................... G06F 40/40 |
| 2022/0138432 A1* | 5/2022 | Galitsky | ............... G06F 40/211 704/9 |

OTHER PUBLICATIONS

What Does BERT Look At ?; Clark et al (Year: 2019).*
TDAM: A topic-dependent attention model for sentiment analysis; Pergola et al (Year: 2018).*

* cited by examiner

*Primary Examiner* — Paul C Mccord
(74) *Attorney, Agent, or Firm* — Keller Preece PLLC

(57) ABSTRACT

Described herein are systems, methods, and other techniques for extracting one or more keyphrases from an input text. The input text may include a plurality of words. A plurality of token-level attention matrices may be generated using a transformer-based machine learning model. The plurality of token-level attention matrices may be converted into a plurality of word-level attention matrices. A set of candidate phrases may be identified from the plurality of words based on the plurality of word-level attention matrices. The one or more keyphrases may be selected from the set of candidate phrases.

20 Claims, 17 Drawing Sheets

Title 630 — U.S., World War II Draft Registration Cards, 1942

Facets 632 — 1940 Era Collections; Draft, Enlistment and Service; Early Settlers of Ohio River Valley; Global New Year's Free Access; Global Records; GoldenRecord; Lower Midwest & Virginia Settlers; MerlinCollections; Military Records; NARA Reports; NE Italy Top; NE Sweden Top; NE US; New York Settlers; Northeastern States Settlers; Records from The National Archives; Remembrance Day Collections; Select Military Records; Southern States Settlers; U.S. Military Records Short Description 634 — U.S., World War II Draft Registration Cards, 1942
This database is an indexed collection of the draft cards from the Fourth Registration, the only registration currently available to the public (the other registrations are not available due to ...)

About U.S., World War II Draft Registration Cards, 1942

Words 612 — The U.S. officially entered World War II on 8 December 1941 following an attack on Pearl Harbor, Hawaii. Just about a year before that, in October 1940, President Roosevelt had signed into law the first peacetime selective service draft in U.S. history, due to rising world conflicts. After the U.S. entered WWII a new selective service act required that all men between ages 18 and 65 register for the draft. Between November 1940 and October 1946, over 10 million American men were registered. This database is an indexed collection of the draft cards from the Fourth Registration. The Fourth Registration, often referred to as the "old man's registration", was conducted on 27 April 1942 and registered men who were born on or between 28 April 1877 and 16 February 1897 - men who were between 45 and 64 years old - and who were not already in the military. Information available on the draft cards includes:

- Name of registrant
- Age
- Birth date
- Birthplace
- Residence
- Employer information
- Name and address of person who would always know the registrant's whereabouts
- Physical description of registrant (race, height, weight, eye and hair colors, complexion)

Additional information such as mailing address (if different from residence address), serial number, order number, and board registration information may also be available.

For individuals who lived near a state border, sometimes their Draft Board Office was located in a neighboring state. Therefore, you may find some people who resided in one state, but registered in another.

Long Description 636

Locating Originals:
The original draft cards are held by each state's National Archives and Records Administration (NARA) Regional Branch. All of these cards are also available on microfilm from the Family History Library (FHL) and/or NARA.

How are the Cards Organized?
The draft cards are arranged by state and are then in alphabetical order by surname, followed by the local draft board number. There may be instances where the cards are filed out of order. For example, there are some surnames beginning with M in the Q-S surname range. These are correct, as the cards were misordered prior to filming.

Note regarding the images for the states of DE, MD, PA, and WV: These four states were microfilmed at the National Archives in such a way that the back of one person's draft card appears at the same image as the front of the next individual's card. Thus, when viewing the scanned image of each person's original draft card you will see the correct front side of each person's draft card, but the back side of the previous person's card. The draft cards for states other than Delaware, Maryland, Pennsylvania, and West Virginia were microfilmed in a different manner and thus images of the original draft cards from those other states display correctly in the database.

Updates:
29 Mar 2019: Added images and records that were missing from the state of Montana.
7 Nov 2019: Changes were made to improve the performance of this collection. No new records were added. 21 May 2020: Added 868 records that were missing from the state of Massachusetts.

Input Text 610 (Collection)

FIG. 6A

Processed Input Text 610A

| Portion of Long Description | Similarity to Short Description | Select? |
|---|---|---|
| The U.S. officially entered World War II on 8 December 1941 following an attack on Pearl Harbor, Hawaii. Just about a year before that, in October 1940, President Roosevelt had signed into law the first peacetime selective service draft in U.S. history, due to rising world conflicts. After the U.S. entered WWII a new selective service act required that all men between ages 18 and 65 register for the draft. Between November 1940 and October 1946, over 10 million American men were registered. This database is an indexed collection of the draft cards from the Fourth Registration. The Fourth Registration, often referred to as the "old man's registration", was conducted on 27 April 1942 and registered men who born on or between 28 April 1877 and 16 February 1897 - men who were between 45 and 64 years old - and who were not already in the military. Information available on the draft cards includes:<br>• Name of registrant<br>• Age<br>• Birth date<br>• Birthplace<br>• Residence<br>• Employer information<br>• Name and address of person who would always know the registrant's whereabouts<br>• Physical description of registrant (race, height, weight, eye and hair colors, complexion) | 0.64 | Yes |
| Additional information such as mailing address (if different from residence address), serial number, order number, and board registration information may also be available. | 0.12 | No |
| For individuals who lived near a state border, sometimes their Draft Board Office was located in a neighboring state. Therefore, you may find some people who resided in one state, but registered in another. | -0.03 | No |
| Locating Originals:<br>The original draft cards are held by each state's National Archives and Records Administration (NARA) Regional Branch. All of these cards are also available on microfilm from the Family History Library (FHL) and/or NARA. | 0.34 | No |
| How are the Cards Organized?<br>The draft cards are arranged by state and are then in alphabetical order by surname, followed by the local draft board number. There may be instances where the cards are filed out of order. For example, there are some surnames beginning with M in the Q-S surname range. These are correct, as the cards were misordered prior to filming. | 0.26 | No |
| Note regarding the images for the states of DE, MD, PA, and WV: These four states were microfilmed at the National Archives in such a way that the back of one person's draft card appears in the same image as the front of the next individual's card. Thus, when viewing the scanned image of each person's original draft card you will see the correct front side of each person's draft card, but the back side of the previous person's card. The draft cards for states other than Delaware, Maryland, Pennsylvania, and West Virginia were microfilmed in a different manner and thus images of the original draft cards from those other states display correctly in the database. | 0.02 | No |
| Updates:<br>28 Mar 2019: Added images and records that were missing from the state of Montana. 7 Nov 2019: Changes were made to improve the performance of this collection. No new records were added. 21 May 2020: Added 868 records that were missing from the state of Massachusetts. | 0.15 | No |

FIG. 6B

| Candidate Phrases 618 | Scores 668 |
|---|---|
| World War II | 2.5 |
| attack on Pearl Harbor Hawaii | 3.2 |
| attack on Pearl Harbor | 3.1 |
| President Roosevelt | 4.4 |
| first peacetime selective service draft | 2.3 |
| selective service draft in U.S. | 3.3 |

FIG. 6G

| Phrases | Scores 668 |
|---|---|
| World War II | 2.5 |
| attack on Pearl Harbor Hawaii | 6.3 |
| President Roosevelt | 4.4 |
| first peacetime selective service draft | 4.28 |

FIG. 6H

| Ranking 670 | Keyphrases 620 | Scores 668 |
|---|---|---|
| 1 | attack on Pearl Harbor Hawaii | 6.3 |
| 2 | President Roosevelt | 4.4 |
| 3 | first peacetime selective service draft | 4.28 |
| 4 | World War II | 2.5 |

FIG. 6I

CONTEXT-BASED KEYPHRASE EXTRACTION FROM INPUT TEXT

CROSS-REFERENCES TO RELATED APPLICATIONS

This application claims the benefit of priority to U.S. Provisional Patent Application No. 63/147,494, filed Feb. 9, 2021, entitled "A CONTEXT-BASED TOOL FOR AUTOMATIC KEYPHRASE EXTRACTION," the entire content of which is incorporated herein by reference for all purposes.

BACKGROUND OF THE INVENTION

Keyphrases may be defined as the set of terms or words in a text that provide a brief summary of the context of the text. For example, the keyphrases may relate to the main topics discussed in a given text. The keyphrases may directly appear in a text, and may therefore be identified based on an analysis of the text. The task of identifying keyphrases within a text may be referred to as "keyphrase extraction". Since few authors provide keyphrases with their text (due in part to the laborious task of doing so), automatic keyphrase extraction using, for example, machine learning techniques have garnered significant attention.

Keyphrases have been used for document summarization, topic-based document searches, document clustering, among other applications. For example, document keyphrases have allowed for fast searching for a given document from a large collection of documents. However, current techniques for keyphrase extraction lack the efficiency and accuracy needed for many applications, such as the extraction of keyphrases from genealogical descriptions. This can be important in genealogical research, as tens of thousands of genealogical record collections may be stored in a database, such that manually tagging keyphrases for each collection is impractical. Moreover, such collections are often acquired and added to the database at such a rate that it is onerous to manually extract keyphrases. Because keyphrases are used in, for example, search engine retrieval, accurate and consistent determination of keyphrases is important. Manual extraction, by contrast, is inherently subjective and prone to errors and biases; that is, there is no objectively correct standard to evaluate a method for extracting keyphrases. Accurate keyphrase extraction is increasingly important for such research as genealogy researchers, including casual researchers, need to quickly assess the likely success of searching particular collections.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method for extracting one or more of keyphrases from an input text, the computer-implemented method comprising: receiving the input text having a plurality of words; providing the plurality of words to a transformer-based machine learning model; generating, using the transformer-based machine learning model, a plurality of token-level attention matrices that indicate context-based relationship values between tokens in the plurality of words; converting the plurality of token-level attention matrices into a plurality of word-level attention matrices that indicate context-based relationship values between the plurality of words; identifying a set of candidate phrases from the plurality of words based on the plurality of word-level attention matrices, wherein each of the set of candidate phrases includes one or more words from the plurality of words; and selecting the one or more keyphrases from the set of candidate phrases.

Example 2 is the computer-implemented method of example(s) 1, further comprising: generating a plurality of clusters based on the plurality of word-level attention matrices, wherein each of the plurality of clusters is generated based on the context-based relationship values between the plurality of words, and wherein the set of candidate phrases are identified based on the plurality of clusters.

Example 3 is the computer-implemented method of example(s) 2, wherein the plurality of clusters are generated by determining which of the context-based relationship values between the plurality of words are greater than a threshold.

Example 4 is the computer-implemented method of example(s) 1-3, further comprising: preprocessing the input text by dividing the plurality of words into a plurality of segments, wherein each of the plurality of segments is separately provided to the transformer-based machine learning model.

Example 5 is the computer-implemented method of example(s) 1-4, wherein the transformer-based machine learning model includes a plurality of heads, wherein each of the plurality of heads (i) includes a set of attention weights and (ii) generates one of the plurality of token-level attention matrices.

Example 6 is the computer-implemented method of example(s) 1-5, wherein the transformer-based machine learning model is a Bidirectional Encoder Representations from Transformers (BERT) model.

Example 7 is the computer-implemented method of example(s) 1-6, wherein selecting the one or more keyphrases from the set of candidate phrases includes: determining a set of scores for the set of candidate phrases based on the context-based relationship values between the plurality of words.

Example 8 is a non-transitory computer-readable medium comprising instructions that, when executed by one or more processors, cause the one or more processors to perform operations comprising: receiving an input text having a plurality of words; providing the plurality of words to a transformer-based machine learning model; generating, using the transformer-based machine learning model, a plurality of token-level attention matrices that indicate context-based relationship values between tokens in the plurality of words; converting the plurality of token-level attention matrices into a plurality of word-level attention matrices that indicate context-based relationship values between the plurality of words; identifying a set of candidate phrases from the plurality of words based on the plurality of word-level attention matrices, wherein each of the set of candidate phrases includes one or more words from the plurality of words; and selecting one or more keyphrases from the set of candidate phrases.

Example 9 is the non-transitory computer-readable medium of example(s) 8, wherein the operations further comprise: generating a plurality of clusters based on the plurality of word-level attention matrices, wherein each of the plurality of clusters is generated based on the context-based relationship values between the plurality of words, and wherein the set of candidate phrases are identified based on the plurality of clusters.

Example 10 is the non-transitory computer-readable medium of example(s) 9, wherein the plurality of clusters are generated by determining which of the context-based relationship values between the plurality of words are greater than a threshold.

Example 11 is the non-transitory computer-readable medium of example(s) 8-10, further comprising: preprocessing the input text by dividing the plurality of words into a plurality of segments, wherein each of the plurality of segments is separately provided to the transformer-based machine learning model.

Example 12 is the non-transitory computer-readable medium of example(s) 8-11, wherein the transformer-based machine learning model includes a plurality of heads, wherein each of the plurality of heads (i) includes a set of attention weights and (ii) generates one of the plurality of token-level attention matrices.

Example 13 is the non-transitory computer-readable medium of example(s) 8-12, wherein the transformer-based machine learning model is a Bidirectional Encoder Representations from Transformers (BERT) model.

Example 14 is the non-transitory computer-readable medium of example(s) 8-13, wherein selecting the one or more keyphrases from the set of candidate phrases includes: determining a set of scores for the set of candidate phrases based on the context-based relationship values between the plurality of words.

Example 15 is a system comprising, one or more processors; and a computer-readable medium comprising instructions that, when executed by the one or more processors, cause the one or more processors to perform operations comprising: receiving an input text having a plurality of words; providing the plurality of words to a transformer-based machine learning model; generating, using the transformer-based machine learning model, a plurality of token-level attention matrices that indicate context-based relationship values between tokens in the plurality of words; converting the plurality of token-level attention matrices into a plurality of word-level attention matrices that indicate context-based relationship values between the plurality of words; identifying a set of candidate phrases from the plurality of words based on the plurality of word-level attention matrices, wherein each of the set of candidate phrases includes one or more words from the plurality of words; and selecting one or more keyphrases from the set of candidate phrases.

Example 16 is the system of example(s) 15, wherein the operations further comprise: generating a plurality of clusters based on the plurality of word-level attention matrices, wherein each of the plurality of clusters is generated based on the context-based relationship values between the plurality of words, and wherein the set of candidate phrases are identified based on the plurality of clusters.

Example 17 is the system of example(s) 16, wherein the plurality of clusters are generated by determining which of the context-based relationship values between the plurality of words are greater than a threshold.

Example 18 is the system of example(s) 15-17, further comprising: preprocessing the input text by dividing the plurality of words into a plurality of segments, wherein each of the plurality of segments is separately provided to the transformer-based machine learning model.

Example 19 is the system of example(s) 15-18, wherein the transformer-based machine learning model includes a plurality of heads, wherein each of the plurality of heads (i) includes a set of attention weights and (ii) generates one of the plurality of token-level attention matrices.

Example 20 is the system of example(s) 15-19, wherein selecting the one or more keyphrases from the set of candidate phrases includes: determining a set of scores for the set of candidate phrases based on the context-based relationship values between the plurality of words.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 6A-6I illustrate an example of an extraction of a set of keyphrases from an input text using a keyphrase extraction system.

DETAILED DESCRIPTION OF THE INVENTION

Figure 1:
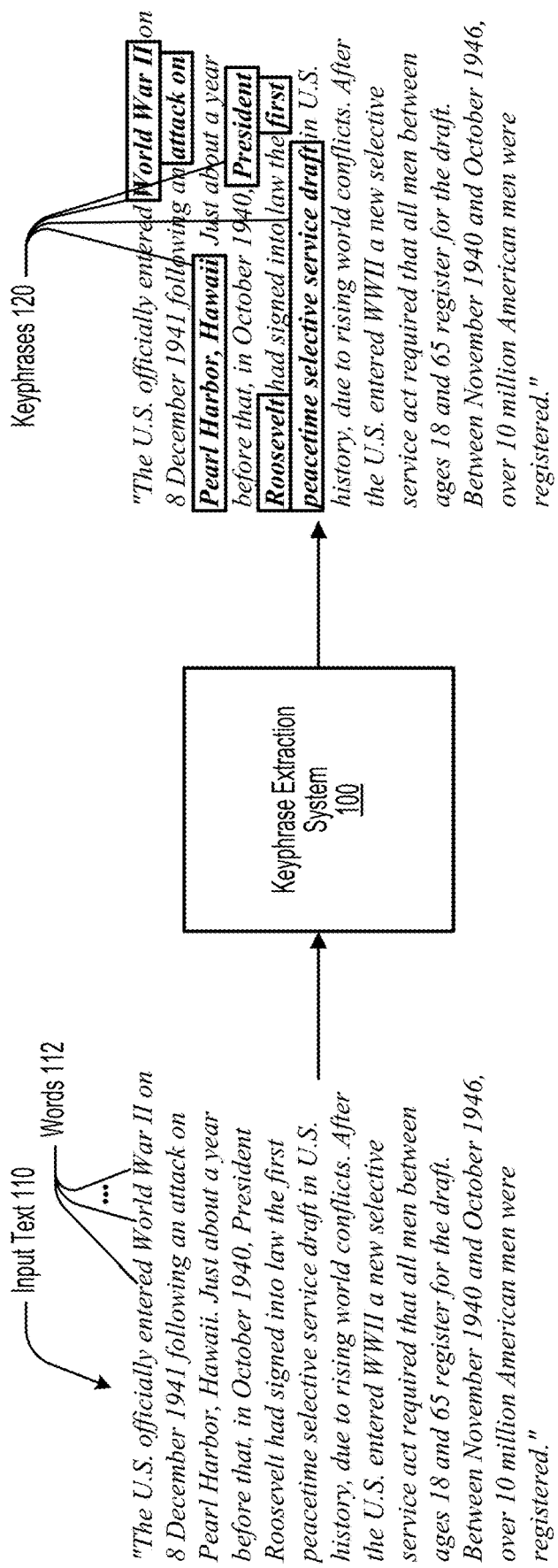
FIG. 1 illustrates an example functionality of a keyphrase extraction system.

One goal of keyphrase or terminology extraction is to get structured information from unstructured data. In general, keyphrase extraction attempts to extract keyphrases from a text such that (1) the keyphrases contain a concise description of the text and/or (2) the keyphrases are relevant to one or more of the text's major topics so that the keyphrases provide a coverage thereof. In some instances, a keyphrase extraction task may be difficult to evaluate as there is no objectively correct set of keyphrases even among human-labeled samples. Other difficulties associated with keyphrase extraction include: document length, structural inconsistency, changes in topic, and a lack of correlation between topics.

In some instances, a keyphrase extraction task consists of two main steps: (1) candidate term identification and (2) keyphrase selection. In the first step, candidate term identification is performed by identifying terms (e.g., words and/or phrases) that convey the topical content of a text or document. Several methods have been proposed to accomplish candidate term identification, such as brute force approaches, n-grams extraction, extracting POS patterns, using knowledge bases such as Wikipedia or WordNet, among others.

For the second step, keyphrase selection may be performed by scoring or ranking the candidate terms that were identified in the first step, followed by selecting the "best" candidates. The two main approaches that have been proposed to accomplish keyphrases selection include: (1) frequency statistics such as calculating the term frequency-inverse document frequency (TF-IDF) or the Okapi BM25 for terms and choosing the terms with the highest weights and (2) machine learning approaches which can be supervised methods, unsupervised methods, or hybrid methods.

Unsupervised methods attempt to extract the underlying structure of the data without the assistance of previously-labeled examples. Some unsupervised approaches that have been proposed include: (1) graph-based ranking methods, (2) topic-based clustering, (3) simultaneous learning, and (4) language modeling. For graph-based ranking methods, the importance of a candidate is determined by its "relatedness" to other candidates. Relatedness can be interpreted as co-occurrence or semantic relations (semantic-relatedness). A document may be represented by a network where the nodes are keyphrases. A candidate phrase is important if it is connected to important keyphrases or a large number of keyphrases. Then nodes are ranked based on their importance using a graph-based ranking method. Some examples of these algorithms include TextRank, DivRank, SingleRank, ExpandRank, CollabRank, among others.

For topic-based clustering, the candidates are grouped into topics such that each topic is composed of several keyphrases. For simultaneous learning, text summarization and keyphrase extraction are performed simultaneously based on the key observations that important words appear in important sentences and a sentence is important if it contains important words. For language modeling, candidates may be scored based on their informativeness (i.e., the extent to which they capture the idea of the document) and "keyphraseness" (the extent to which a word sequence can be treated as a phrase).

Supervised methods have also been proposed. Some of these methods reformulate the keyphrase extraction task into a simple binary classification method that classifies the candidate phrases into "keyphrases" or "not keyphrases". Some of these methods may also turn the keyphrase extraction task into a ranking problem that ranks candidates pairwise according to the degree of "keyness" and, in some instances, create a competition between keyphrases. The top N keyphrases may be chosen as the document's keyphrases. In some instances, these ranking supervised methods outperform the binary classification methods.

Supervised methods may also include feature design methods. In some instances, such methods can use statistical features like TF-IDF, distance of a phrase (the number of words preceding to the first occurrence of the phrase normalized by the number of words in a document), phrase length (number of constituent words), phrase position (normalized position within a document of first and/or last occurrence therein), spread (the number of words between the first and last occurrence of the phrase), and "supervised keyphraseness" (number of times a keyphrase appears as such in the training data).

Embodiments of the present disclosure relate to a technique for extracting key phrases from text using a transformer-based machine learning model. The text may be passed through the model to generate attention matrices that contain context-based relationship values for the tokens in the input text. In some instances, these attention matrices may then be converted into new matrices that contain new context-based relationship values for the words in the input text. Next, the context-based relationship values are analyzed to determine which words/tokens have the strongest connections. Strongly connected words are formed into clusters, which are cleaned and denoised to form candidate phrases. Finally, keyphrases are selected from the candidate phrases based on a scoring and ranking scheme.

The architecture of the transformer-based machine learning model may include a number of encoder layers and self-attention heads, each of which may include a set of attention weights. In some instances, the model used is a Bidirectional Encoder Representations from Transformers (BERT) that is pre-trained and fine-tuned on the specific downstream task. For example, the pre-trained BERT model may be fine-tuned using genealogical descriptions from a genealogy database and then deployed in genealogy applications. With the multi-head attention design inherent from the transformer model, BERT is very effective at understanding the meaning over long spans of text. While previous work has utilized BERT for various tasks, none of this work directly utilizes the attention matrices produced by the encoders of BERT for downstream tasks. Recent work on exploring the mechanism of attention weights has revealed that the heads of BERT attend to the direct objects of verbs, determiners of nouns, objects of prepositions, and coreferent mentions with remarkably high accuracy.

Various benefits are achieved by way of the described embodiments. For example, compared to previous work in automatic keyphrase extraction, the described technique provides at least the following advantages: (1) The described technique may be single document based; i.e. the method doesn't require a training corpus nor does it rely on external statistics or tools such as TF-IDF statistics or WordNet; (2) The described technique may be unsupervised and training-free. For example, the described technique may directly utilize the contextual information encoded in the pre-trained BERT model, and as such may not require any labeled data; (3) The described technique may utilize relationships between tokens learned through a contextual-based model. Compared to statistical methods (such as TF-IDF, RAKE, etc.), the described approach does not use explicitly defined statistics to represent the importance of keyphrases. Compared to embedding-based approaches, the described technique works directly with the contextual-based relationships between tokens/words instead of the contextual-based representations of tokens/words. While some examples provided herein correspond to the extraction of keyphrases from genealogical descriptions, embodiments are widely applicable to a number of texts, such as customer reviews, newspaper articles, voice transcriptions, and the like.

Some embodiments of the present disclosure include a data preprocessing step, in which an input text can be filtered, denoised, refined, or otherwise modified to prepare for subsequent steps. In some instances, the input text may be a collection having a long description that includes multiple paragraphs. The long description might contain relevant and/or irrelevant information. In order to decrease noise for the task of candidate phrase identification as well as other tasks, it may be desirable to keep only the relevant information. In some instances, a collection input text might also have a short description that describes the most important information in the collection.

In some instances, the short description may be expanded in the long description. To keep only the relevant information, in some embodiments, a Universal Sentence Encoder may be used to calculate the semantic similarity of the short description with each paragraph in the long description. The Universal Sentence Encoder may return an embedding vector for the short description and for each paragraph, and the similarity between the short description and each paragraph may be calculated using an inner product of the embedding vectors. The paragraphs with the highest similarity (or greater than a threshold) are considered to be the most relevant and may be retrieved as the main collection description.

Some embodiments of the present disclosure include a keyphrase identification step, which may also be referred to as a candidate phrase identification step. As described above, during this step, the text may be provided to a transformer-based machine learning model that generates attention matrices that contain context-based relationship values for the tokens in the input text. The context-based relationship values for the tokens can be combined to correspond to the words in the text, and strongly connected words can be formed into clusters. Keyphrases are then identified based on the clusters. Some embodiments of the present disclosure include a keyphrase selection step, in which one or more of the previously identified phrases are selected.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

The figures herein follow a numbering convention in which the first digit or digits correspond to the figure number and the remaining digits identify an element or component in the figure. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and eliminated so as to provide a number of additional embodiments of the present disclosure. In addition, the proportion and the relative scale of the elements provided in the figures are intended to illustrate certain embodiments of the present disclosure and should not be taken in a limiting sense.

FIG. 1 illustrates an example functionality of a keyphrase extraction system 100, in accordance with some embodiments of the present disclosure. Keyphrase extraction system 100 may receive an input text 110 having a plurality of words 112 as input, and may extract a set of keyphrases 120 based on input text 110. Each of keyphrases 120 may include one or more consecutive words from words 112. In the illustrated example, keyphrase extraction system 100 extracts four different keyphrases from input text 110, including "World War II", "attack on Pearl Harbor, Hawaii", "President Roosevelt", and "first peacetime selective service draft".

Figure 2:
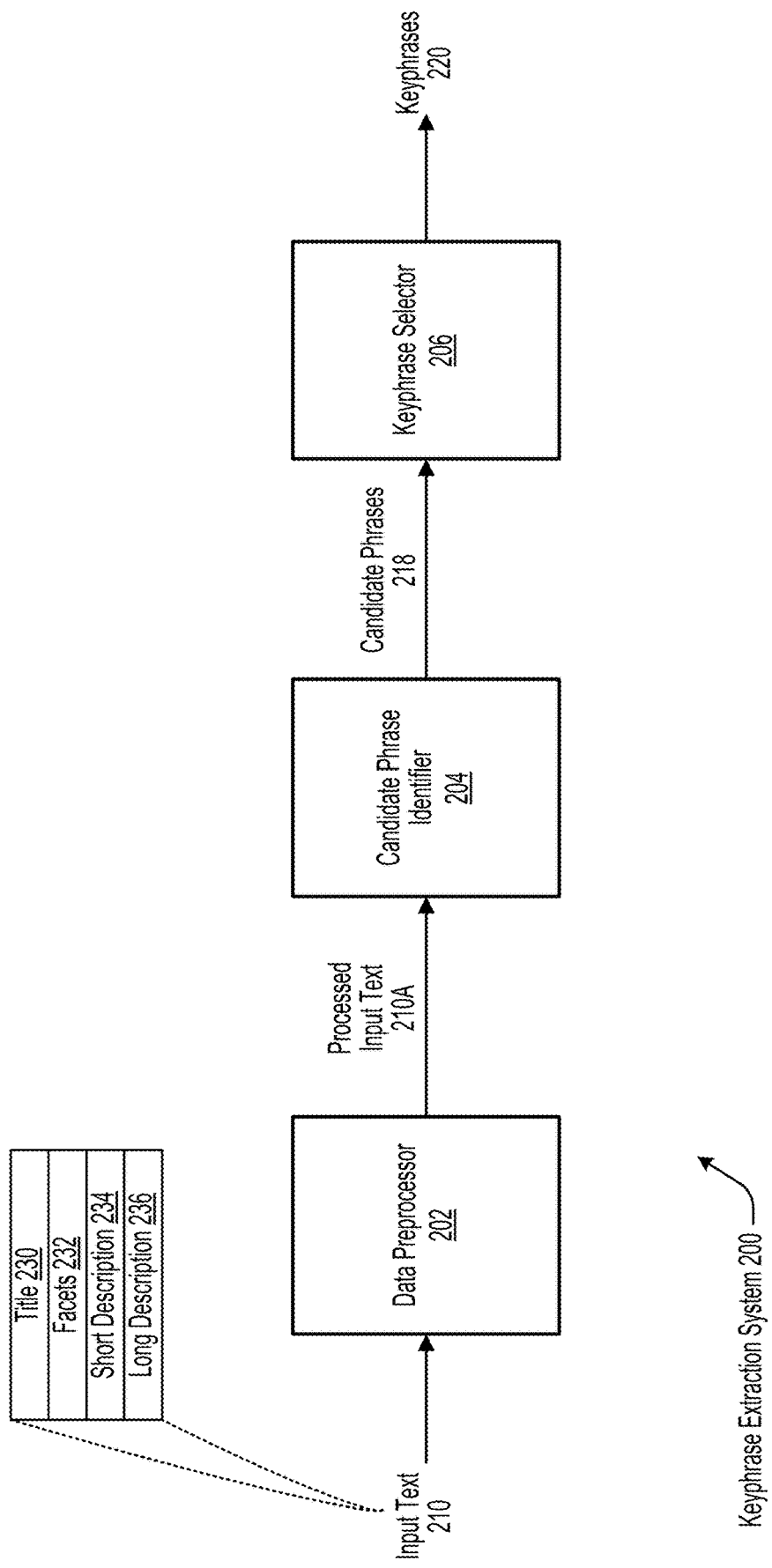
FIG. 2 illustrates an example of a keyphrase extraction system.

FIG. 2 illustrates an example of a keyphrase extraction system 200, in accordance with some embodiments of the present disclosure. Keyphrase extraction system 200 may be similar to keyphrase extraction system 100 described in FIG. 1. For example, keyphrase extraction system 200 may receive an input text 210 having a plurality of words. In some embodiments, the words of input text 210 may be divided between different sections of input text 210 including, for example, a title 230, a set of facets 232, a short description 234, and a long description 236. In some embodiments, input text 210 may have the form of a collection having one or more of title 230, facets 232, short description 234, and long description 236. For example, in the context of genealogy, input text 210 may have the form of a genealogy collection that may be retrievable by a user of a genealogy database. A genealogy collection having such a structure (e.g., having a title, facets, descriptions, etc.) may allow the genealogy data contained therein to be more accessible to a user who desires to research a particular historical person, place, or event.

In some embodiments, keyphrase extraction system 200 may include a data preprocessor 202, a candidate phrase identifier 204, and a keyphrase selector 206. In some embodiments, data preprocessor 202 may be optional such that input text 210 may be passed directly to candidate phrase identifier 204 without the preprocessing step. In some embodiments, data preprocessor 202 may receive input text 210 and generate a processed input text 210A, which may be a modified version of input text 210. For example, data preprocessor 202 may reduce the number of words in input text 210 by determining which words do not contribute to determining candidate phrases 218 and/or keyphrases 220 and removing those words. Data preprocessor 202 may remove entire sections (e.g., short description 234) or portions of individual sections (e.g., removing a single or multiple paragraphs from long description 236). Data preprocessor 202 may also divide input text 210 into multiple segments based on the maximum number of tokens that the transformed-based machine learning model of candidate phrase identifier 204 can handle.

In some embodiments, candidate phrase identifier 204 may receive input text 210 (or processed input text 210A) and identify a set of candidate phrases 218 from the words of input text 210. Each of candidate phrases 218 may include one or more consecutive words from input text 210 (or processed input text 210A) that are determined to be good candidates from which keyphrases 220 may be selected. For example, a first candidate phrase may include words 5 to 10 of input text 210 (i.e., w5-w10), a second candidate phrase may include words 14 to 15 of input text 210 (i.e., w14-w15), and a third candidate phrase may include word 30 of input text 210 (i.e., w30).

In some embodiments, keyphrase selector 206 may receive candidate phrases 218 from candidate phrase identifier 204 and select one or more phrases from candidate phrases 218 as keyphrases 220. Continuing with the above example, keyphrase selector 206 may receive the following candidate phrases 218 from candidate phrase identifier 204: [w5-w10], [w14-w15], and [w30], and may select phrases [w5-w10] and [w30] to be keyphrases 220. In some instances, keyphrase selector 206 may calculate scores for candidate phrases 218 and rank candidate phrases 218 based on their scores.

Figure 3:
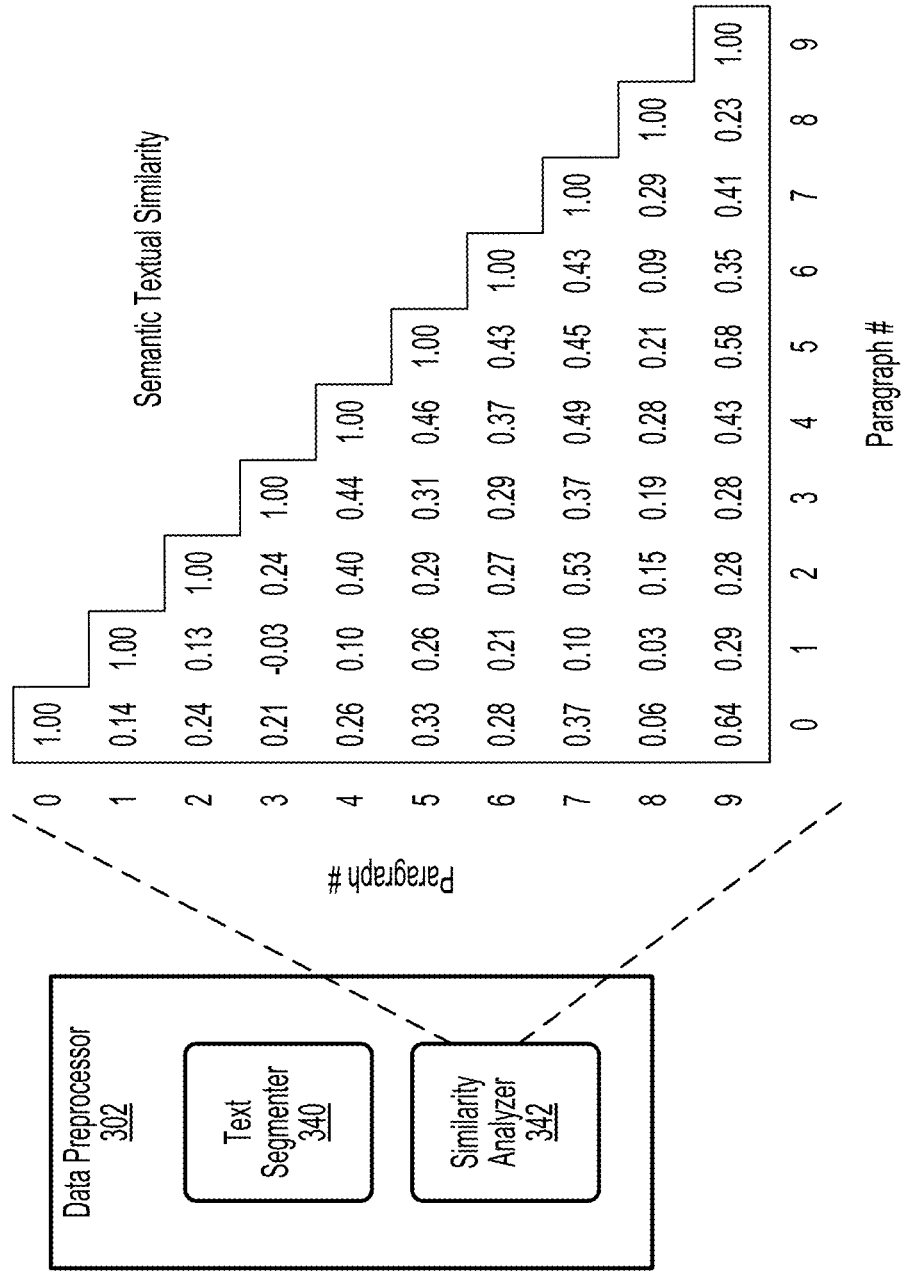
FIG. 3 illustrates an example of a data preprocessor.

FIG. 3 illustrates an example of a data preprocessor 302, in accordance with some embodiments of the present disclosure. Data preprocessor 302 may include a text segmenter 340 and a similarity analyzer 342. In some instances, text segmenter 340 may divide the input text into multiple segments so that the text is able to be processed by the candidate phrase identifier. In one example, the transformer model may have an architecture that only accepts a maximum number of tokens (e.g., 100 tokens), and text segmenter 340 may divide the input text into multiple segments each comprising a number of tokens equal to or less than the maximum number of tokens (e.g., three segments each including 100 tokens). In some examples, the segments may overlap at least partially. For example, for an input text comprising 240 tokens and a transformer model that accepts a maximum of 100 tokens, the input text may be divided into three segments respectively including tokens 1 to 100, 70 to 170, and 140 to 240.

Similarity analyzer 342 may be used to determine the similarity between portions (e.g., paragraphs) of the input text for the purpose of removing portions that may less relevant to the text's main topic. In some instances, similarity analyzer 342 may calculate a set of similarity scores between different pairs of paragraphs of the input text. In the illustrated example, the similarity between nine different paragraphs (e.g., Paragraphs 1-9) of an input text was calculated using a sentence encoder model (e.g., Universal Sentence Encoder). In some embodiments, certain paragraphs of the input text may be removed based on the similarity scores relative to a particular paragraph (e.g., relative to Paragraph 0, which may be a paragraph from the short description) or relative to multiple paragraphs (e.g., average similarity of Paragraph 0 relative to Paragraphs 1-9, average similarity of Paragraph 1 relative to Paragraphs 0 and 3-9, etc.). For example, paragraphs with lower similarity scores and/or lower average similarity scores may be removed while paragraphs with higher similarity scores and/or higher average similarity scores may be retained.

Figure 4:
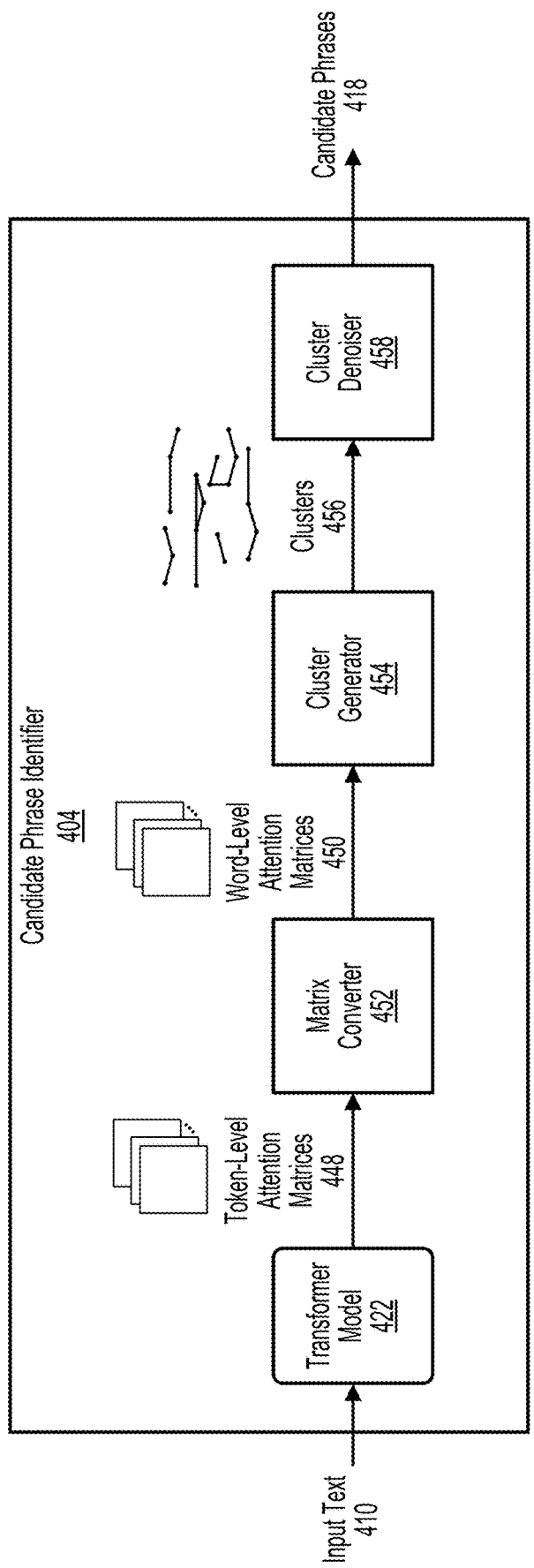
FIG. 4 illustrates an example of a candidate phrase identifier.

FIG. 4 illustrates an example of a candidate phrase identifier 404, in accordance with some embodiments of the present disclosure. In some embodiments, candidate phrase identifier 404 may include a transformer model 422, which may be alternatively referred to as a transformer-based machine learning model. Transformer model 422 may be implemented by a computing device having instructions stored therein for executing transformer model 422. In some instances, transformer model 422 may include a number of encoder layers and self-attention heads, each including a set of attention weights.

When an input text 410 is provided as an input to transformer model 422, transformer model 422 may generate a plurality of token-level attention matrices 448. The number of token-level attention matrices 448 that are generated may be equal to the number of encoder layers multiplied by the number of self-attention heads, which is also the number of encoders times the number of heads in each encoder. In some embodiments, transformer model 422 is a pre-trained BERT model where the number of token-level attention matrices 448 is 12×12=144.

The dimensions of each matrix of token-level attention matrices 448 may be d×d where d is the number of tokens in input text 410. If input text 410 is too large such that d is greater than the maximum number of tokens allowed by transformer model 422, input text 410 may be divided into overlapping segments and each segment may be separately provided as input to transformer model 422. Different matrices generated using different segments may be combined so that the number of token-level attention matrices 448 is still equal to the number of encoder layers multiplied by the number of self-attention heads, while the size of each of token-level attention matrices 448 will be larger than d×d. This process is described in greater detail with respect to FIG. 7.

The values contained in each of token-level attention matrices 448 may be referred to as context-based relationship values. Each value may correspond to two tokens and may indicate how strongly the two tokens are related for a particular attention mechanism, where each of token-level attention matrices 448 corresponds to a different attention mechanism. Each value may be directional such that a first value in a particular token-level attention matrix may indicate how strongly a first token is related to a second token for a particular attention mechanism and a second value in the particular token-level attention matrix may indicate how strongly the second token is related to the first token for the particular attention mechanism.

Matrix converter 452 may convert token-level attention matrices 448 into word-level attention matrices 450. The values contained in each of word-level attention matrices 450 may also be referred to as context-based relationship values, however each value may correspond to two words and may indicate how strongly the two words are related for a particular attention mechanism. Similar to that described for token-level attention matrices 448, each of word-level attention matrices 450 may correspond to a different attention mechanism, and each context-based relationship value may be directional such that a first value in a particular word-level attention matrix may indicate how strongly a first word is related to a second word for a particular attention mechanism and a second word in the particular word-level attention matrix may indicate how strongly the second word is related to the first word for the particular attention mechanism.

In some examples, matrix converter 452 converts token-level attention matrices 448 into word-level attention matrices 450 by combining or merging rows and columns for tokens into rows and columns for words. Rows and columns may be combined by taking maximum values, minimum values, average values, or by performing some other calculation to combine values corresponding to the same word. For example, the word "refunded" may be split into three tokens "ref", "##und", and "##ed". Thus, the three rows and three columns of values in each of token-level attention matrices 448 corresponding to "ref", "##und", and "##ed" may be combined into a single row and a single column of values in each of word-level attention matrices 450. In some instances, matrix converter 452 may also eliminate rows and columns for tokens that do not correspond to words, such as [SEP] and [CLS] tokens.

Cluster generator 454 may receive word-level attention matrices 450 from matrix converter 452 and generate a set of clusters 456 based on word-level attention matrices 450. Each cluster of clusters 456 may include a group of words that are determined to be strongly related as indicated by the context-based relationship values in word-level attention matrices 450. In some instances, cluster generator 454 may construct a graph with nodes representing words and edges between nodes representing the corresponding context-based relationship values between the words. Since the values are directional, outgoing edges from a node (representing a particular token/word) may be defined as corresponding to the value that the particular word (or token) attends to the word (or token) represented by the destination node.

Edges in the graph may be trimmed by eliminating all edges representing context-based relationship values that are less than a threshold value. Alternatively or additionally, in some embodiments, all edges in the graph may be eliminated except for the edges representing the top N context-based relationship values in the graph. After trimming, several groups of connected words may remain, with each separate group being one of clusters 456. Since a different graph may be constructed for each of word-level attention matrices 450, different clusters may be generated for each of word-level attention matrices 450. As such, different word-level attention matrices 450 may contribute to clusters 456, which may include groups of words for different attention mechanisms.

Cluster denoiser 458 may clean clusters 456 and remove noise as a final step before identifying candidate phrases 418. In some examples, cluster denoiser 458 may set an upper bound for the length of the phrases (e.g., eight words) and may eliminate any clusters or potential phrases with a number of words above the upper bound. In some examples, cluster denoiser 458 may eliminate any clusters with sufficiently large gaps in the cluster. For example, clusters may be eliminated if any two consecutive tokens/words are separated by more than two tokens/words. For clusters with small gaps (e.g., two or fewer token/words), the missing words are filled in when forming candidate phrases 418 from clusters 456. In some examples, cluster denoiser 458 may eliminate any clusters with words separated by punctuation marks or if a cluster has more than half the tokens being stop words. Clusters beginning or ending with stop words may have those stop words removed.

Figure 5:
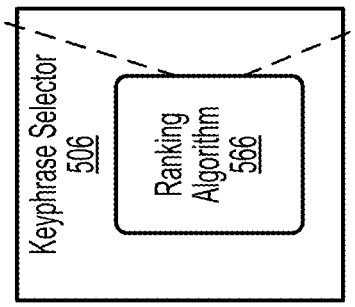
FIG. 5 illustrates an example of a keyphrase selector.

FIG. 5 illustrates an example of a keyphrase selector 506, in accordance with some embodiments of the present disclosure. Keyphrase selector 506 may calculate a set of scores for the candidate phrases. The scores may be calculated as the average context-based relationship values between the words/tokens in the candidate phrases. The scores may be calculated using the values in the token-level attention matrices or the word-level attention matrices. Alternatively or additionally, scores may be calculated based on the connected words in the clusters from which the candidate phrases were formed. For example, a score for a candidate phrase having three connected words in a cluster (in which each word is connected to each other word) may be calculated as the average of the six context-based relationship values between the three words. As another example, a score for a candidate phrase having three connected words in a cluster (in which the first and second words are connected, the second and third words are connected, but the first and third words are not connected) may be calculated as the average of the four context-based relationship values.

Keyphrase selector 506 may include a ranking algorithm 566 that ranks the phrases using the scores and other information about the phrases. Candidate phrases are denoted as $k_0, k_1, \ldots k_W$, and the score for a corresponding candidate phrase $k_i$, is denoted as $s_i$. Modified scores are denoted as $s_i^*$. Ranking algorithm 566 initially sorts the candidate phrases by the position of the first token in the phrase. Next, ranking algorithm 566 moves through each phrase and determines an amount of overlap with other phrases, optionally combining phrases and scores if the overlap is sufficiently high. Finally, the candidate phrases are ranked by their modified scores $s_i^*$ and the top candidates are selected.

In some embodiments, keyphrase selector 506 may include a duplicate detector 528 that determines whether each candidate phrase is a duplicate of another candidate phrase. Duplicate detector 528 may determine whether candidate phrases are exact duplicates or whether one candidate phrase contains another candidate phrase. For candidate phrases that are exact duplicates, one candidate phrase may be removed and the other candidate score may have its score increased by some predetermined amount. For a candidate phrase that contains another candidate phrase, the larger candidate phrase may have its score increased and the smaller candidate phrase may have its score decreased (thereby favoring longer phrases).

Figure 6C:
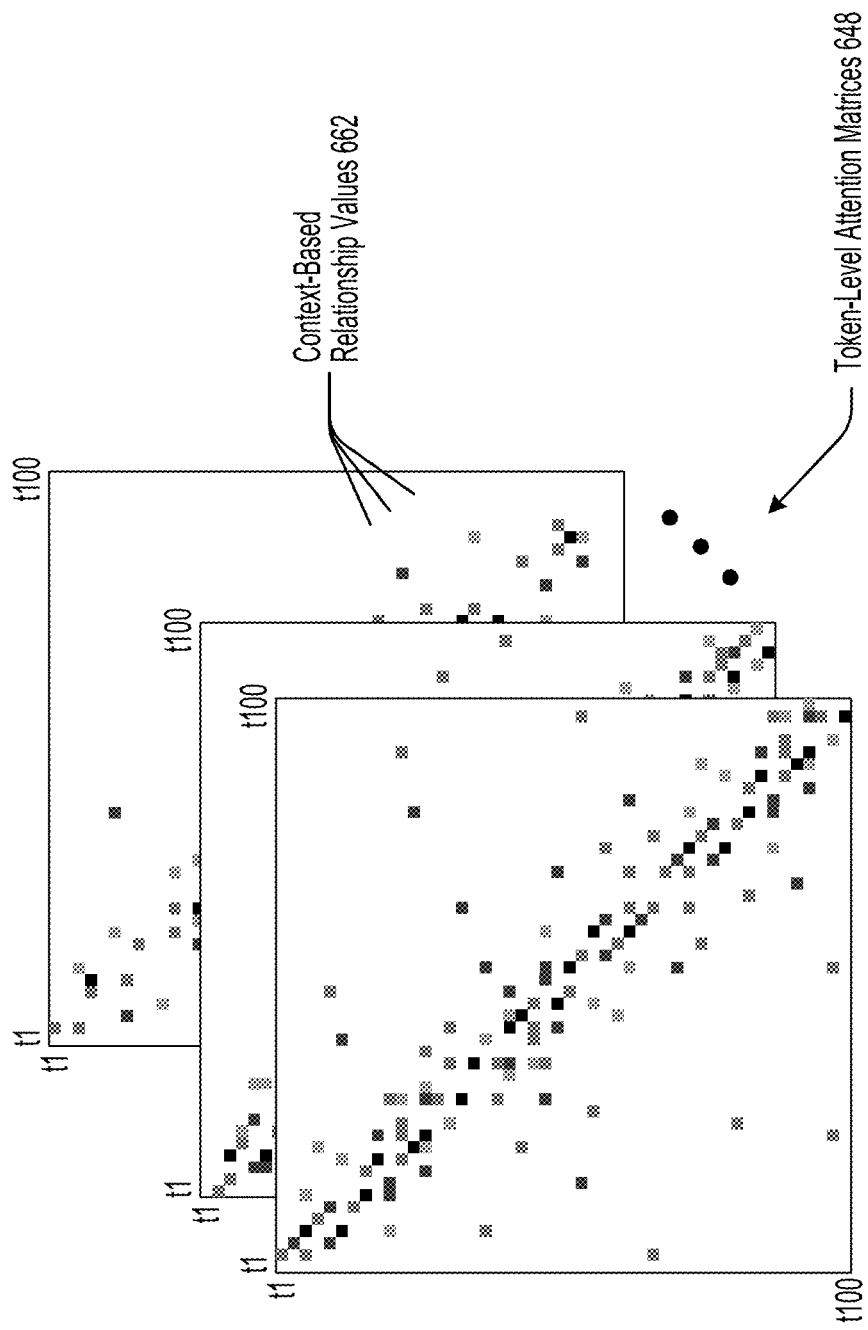

FIGS. 6A-6I illustrate an example of an extraction of a set of keyphrases 620 from an input text 610 using a keyphrase extraction system, in accordance with some embodiments of the present disclosure. FIG. 6A shows an input text 610 having a plurality of words 612. In the illustrated example, words 612 are divided between a title 630, a set of facets 632, a short description 634, and a long description 636. The example illustrated in FIGS. 6A-6I may correspond to a genealogical description found in a genealogy database.

FIG. 6B shows a data preprocessing step, performed by a data preprocessor, in which certain paragraphs and words 612 of input text 610 are removed to produce a processed input text 610A. In the illustrated example, each paragraph of long description 636 is compared to short description 634 to determine a similarity score, with higher similarity scores corresponding to higher levels of similarity. Based on the similarity score, it is determined whether each paragraph is kept or removed from input text 610. In the illustrated example, paragraphs with similarity scores less than 0.5 are removed while the only paragraph having a similarity score greater than 0.5 is selected and included in processed input text 610A. In some embodiments, paragraph similarity may be determined using a sentence encoder model. Alternatively or additionally, short text such as the title and/or facets may be pruned of irrelevant text. For example, in some embodiments TF-IDF can be used to prune irrelevant words from short text components of an input text such as "Golden Records," "Free Access," and other words in facets or otherwise that are not pertinent or informative of the topics of the collection.

FIGS. 6C-6F show a candidate phrase identification step, performed by a candidate phrase identifier. FIG. 6C shows a plurality of token-level attention matrices 648 generated by a transformer model by providing processed input text 610A as input to the transformer model. Each of token-level attention matrices 648 includes context-based relationship values 662 for tokens t1-t100 of processed input text 610A. In the illustrated example, each of token-level attention matrices 648 is a 100×100 matrix of context-based relationship values 662, where darker pixels correspond to larger values.

Figure 6D:
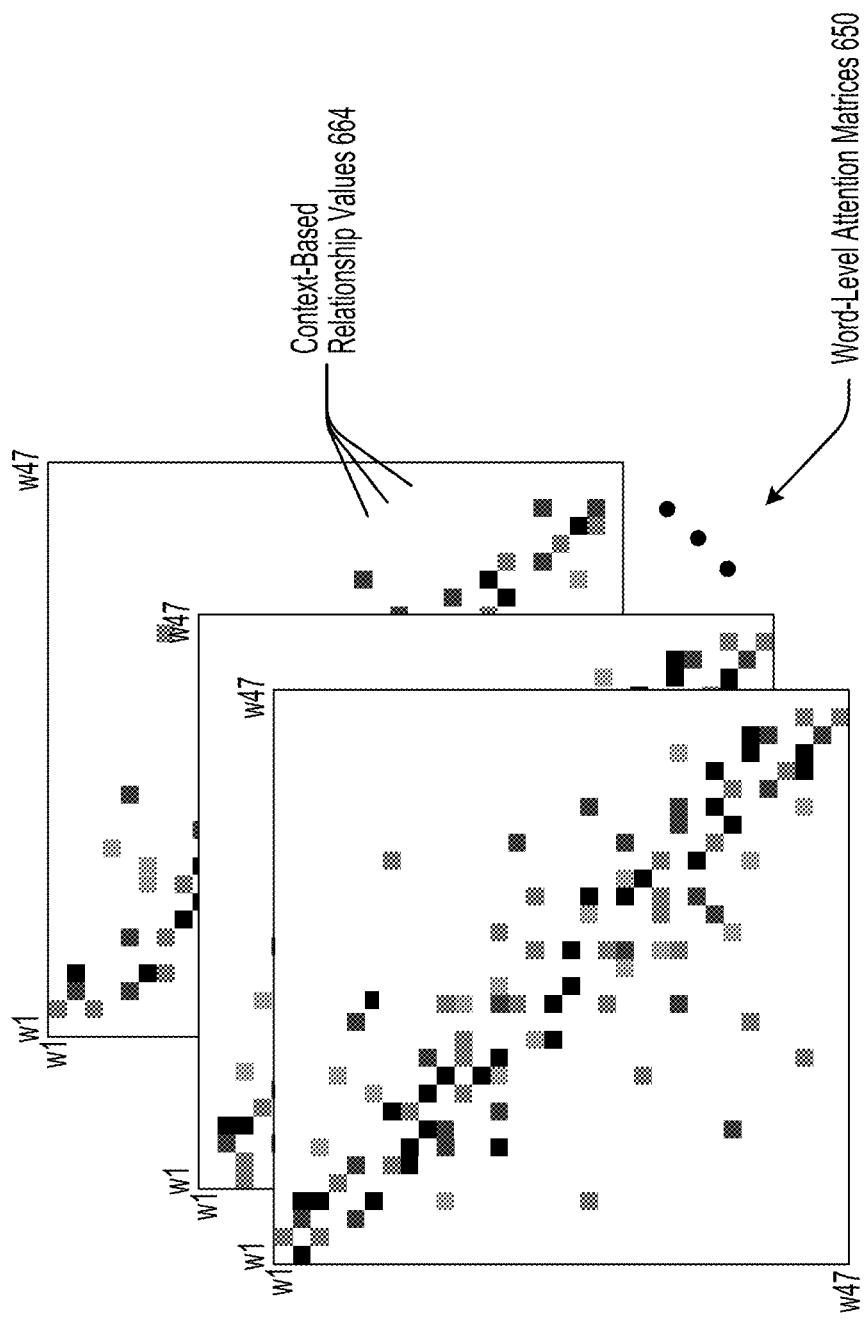

FIG. 6D shows a plurality of word-level attention matrices 650 generated by a matrix converter by providing token-level attention matrices 448 as input to the matrix converter. Each of word-level attention matrices 650 includes context-based relationship values 664 for words w1-w47 of processed input text 610A. In the illustrated example, each of word-level attention matrices 650 is a 47×47 matrix of context-based relationship values 664, where darker pixels correspond to larger values. Each of context-based relationship values 664 may be calculated based on one or more of context-based relationship values 662 by, for example, combining or merging rows and columns of token-level attention matrices 648 to form word-level attention matrices 650.

Figure 6E:
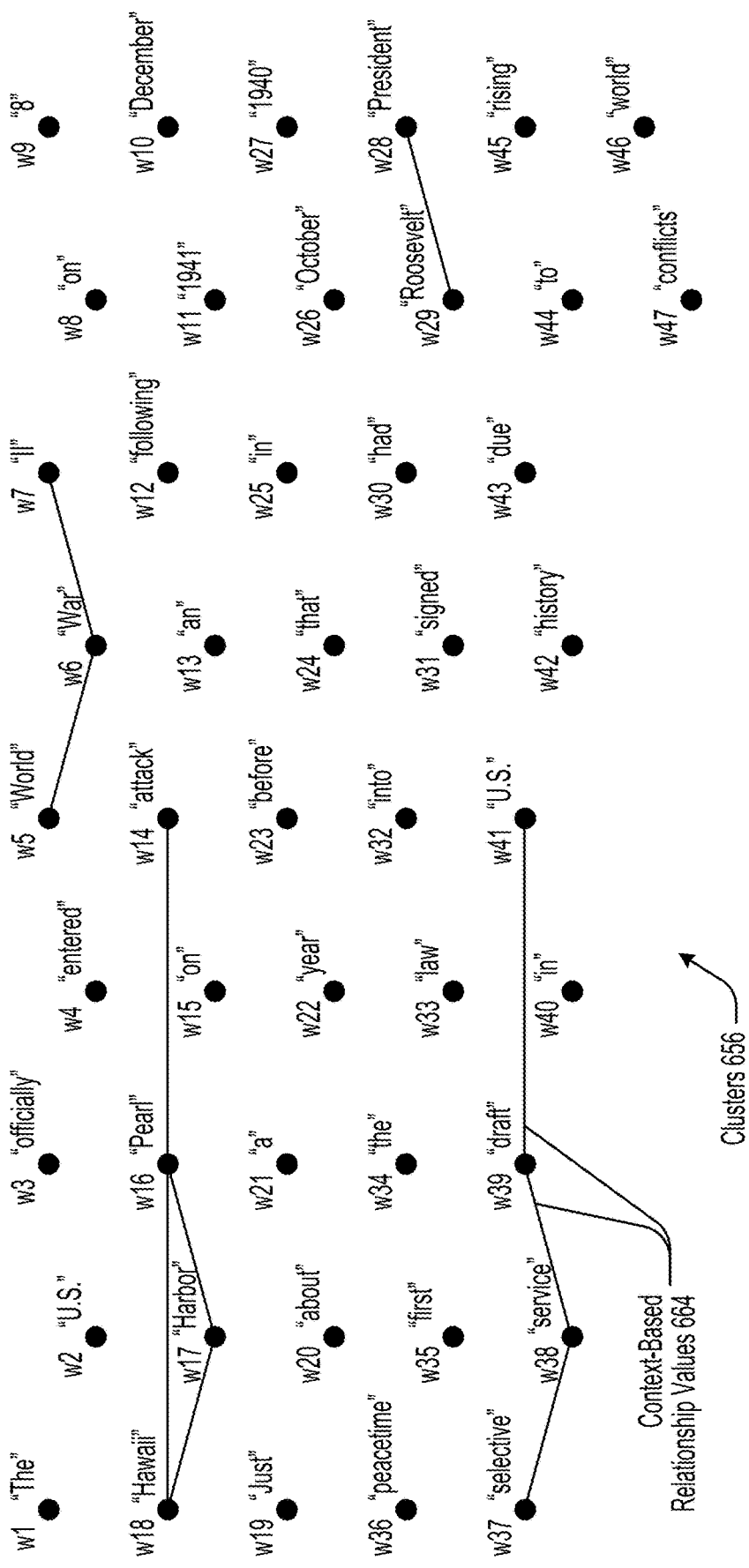

FIG. 6E shows a plurality of clusters 656 generated by a cluster generator by providing word-level attention matrices 450 as input to the cluster generator. The cluster generator may form a graph using word-level attention matrices 650 where words are connected by edges representing context-based relationship values 664. Edges in the graph are then trimmed by eliminating all edges representing context-based relationship values 664 that are less than a threshold value. FIG. 6E shows the remaining edges after the trimming, with connected words forming clusters 656.

Figure 6F:
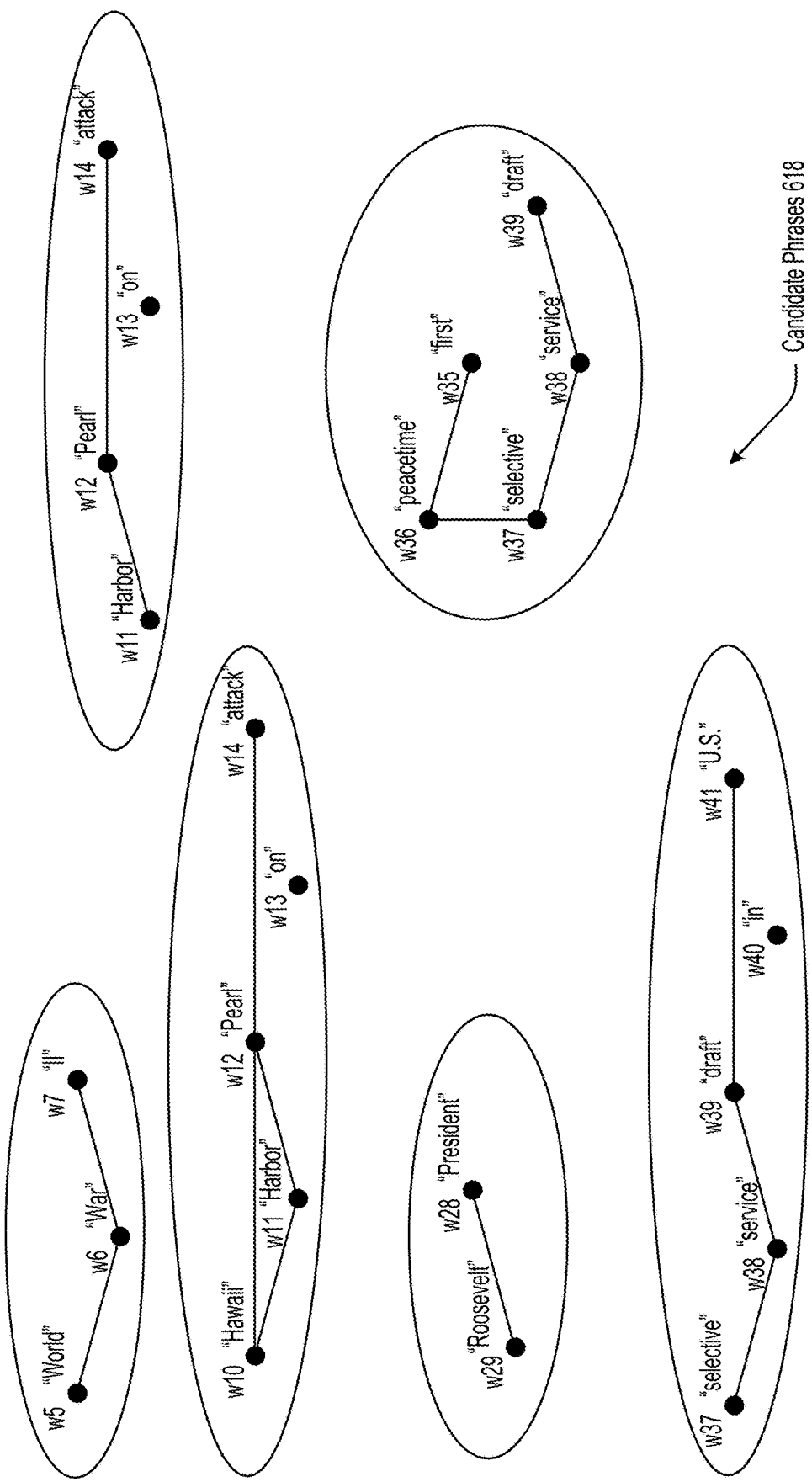

FIG. 6F shows a set of candidate phrases 618 that are obtained by taking clusters 656 and performing denoising operations such as, for example, adding missing words for clusters with small gaps. For example, one of candidate phrases 618 consisting of words w14-w18 is obtained by taking the cluster consisting of words w14 and w16-w18 and adding w15 to form the candidate phrase. As another example, one of candidate phrases 618 consisting of words w37-w41 is obtained by taking the cluster consisting of words w37-w39 and w41 and adding w40 to form the candidate phrase.

FIGS. 6G-6I show a keyphrase selection step, performed by a keyphrase selector. FIG. 6G shows a set of scores 668 for candidate phrases 618 which are calculated based on context-based relationship values 664 between words in clusters 656. For example, a score of 2.5 may be calculated for the candidate phrase "World War II" by averaging the four values of context-based relationship values 664 (e.g., two values between "World" and "War" and two values between "War" and "II"). As another example, a score of 4.4 may be calculated for the candidate phrase "President Roosevelt" by averaging the two values of context-based relationship values 664 (e.g., two values between "President" and "Roosevelt").

FIG. 6H shows a set of modified phrases and a set of modified scores that are obtained by performing a ranking algorithm (e.g., ranking algorithm 566) on candidate phrases 618. In accordance with the ranking algorithm, the phrases are sorted by the position of the first token/word within the text. During a first step of the ranking algorithm, a current candidate variable is set to "World War II" and a seen words variable is set to [empty]. An action is performed to add the phrase "World War II" as a final candidate with a score of 2.5, and the seen words variable is set to "World War II". During a second step of the ranking algorithm, the current candidate variable is set to "attack on Pearl Harbor Hawaii" and the seen words variable is set to "World War II". An action is performed to add the phrase "attack on Pearl Harbor Hawaii" as a final candidate with a score of 3.2, and the seen words variable is set to "World War II" and "attack on Pearl Harbor Hawaii".

During a third step of the ranking algorithm, the current candidate variable is set to "attack on Pearl Harbor" and the seen words variable is set to "World War II" and "attack on Pearl Harbor Hawaii". It is determined that the current candidate variable has a 100% overlap with the seen words variable, and therefore the current candidate is not added as a final candidate. An action is performed to add the score of the current candidate to the score of the overlapped final candidate, causing the score of the phrase "attack on Pearl Harbor Hawaii" to increase by (3.1×100%) from 3.2 to 6.3. During a fourth step of the ranking algorithm, the current candidate variable is set to "President Roosevelt" and the seen words variable is set to "World War II" and "attack on Pearl Harbor Hawaii". An action is performed to add the phrase "President Roosevelt" as a final candidate with a score of 4.4, and the seen words variable is set to "World War II", "attack on Pearl Harbor Hawaii", and "President Roosevelt".

During a fifth step of the ranking algorithm, the current candidate variable is set to "first peacetime selective service draft" and the seen words variable is set to seen words variable is set to "World War II", "attack on Pearl Harbor Hawaii", and "President Roosevelt". An action is performed to add the phrase "first peacetime selective service draft" as a final candidate with a score of 2.3, and the seen words variable is set to "World War II", "attack on Pearl Harbor Hawaii", "President Roosevelt", and "first peacetime selective service draft". During a sixth step of the ranking algorithm, the current candidate variable is set to "selective service draft in U.S." and the seen words variable is set to "World War II", "attack on Pearl Harbor Hawaii", "President Roosevelt", and "first peacetime selective service draft". It is determined that the current candidate variable has a 60% (3/5) overlap with the seen words variable, and therefore the current candidate is not added as a final candidate. An action is performed to add the score of the current candidate to the score of the overlapped final candidate, causing the score of the phrase "first peacetime selective service draft" to increase by (3.3×60%) from 2.3 to 4.28.

FIG. 6I shows a set of keyphrases 620 and a ranking 670 obtained by ordering the phrases obtained in FIG. 6H by the modified scores shown in FIG. 6H. In some examples, the keyphrase selector may select the candidate phrases having scores above some threshold (e.g., 4) to be keyphrases 620. In some examples, only the candidate phrases with the top N (e.g., two) scores may be selected as keyphrases 620.

Figure 7:
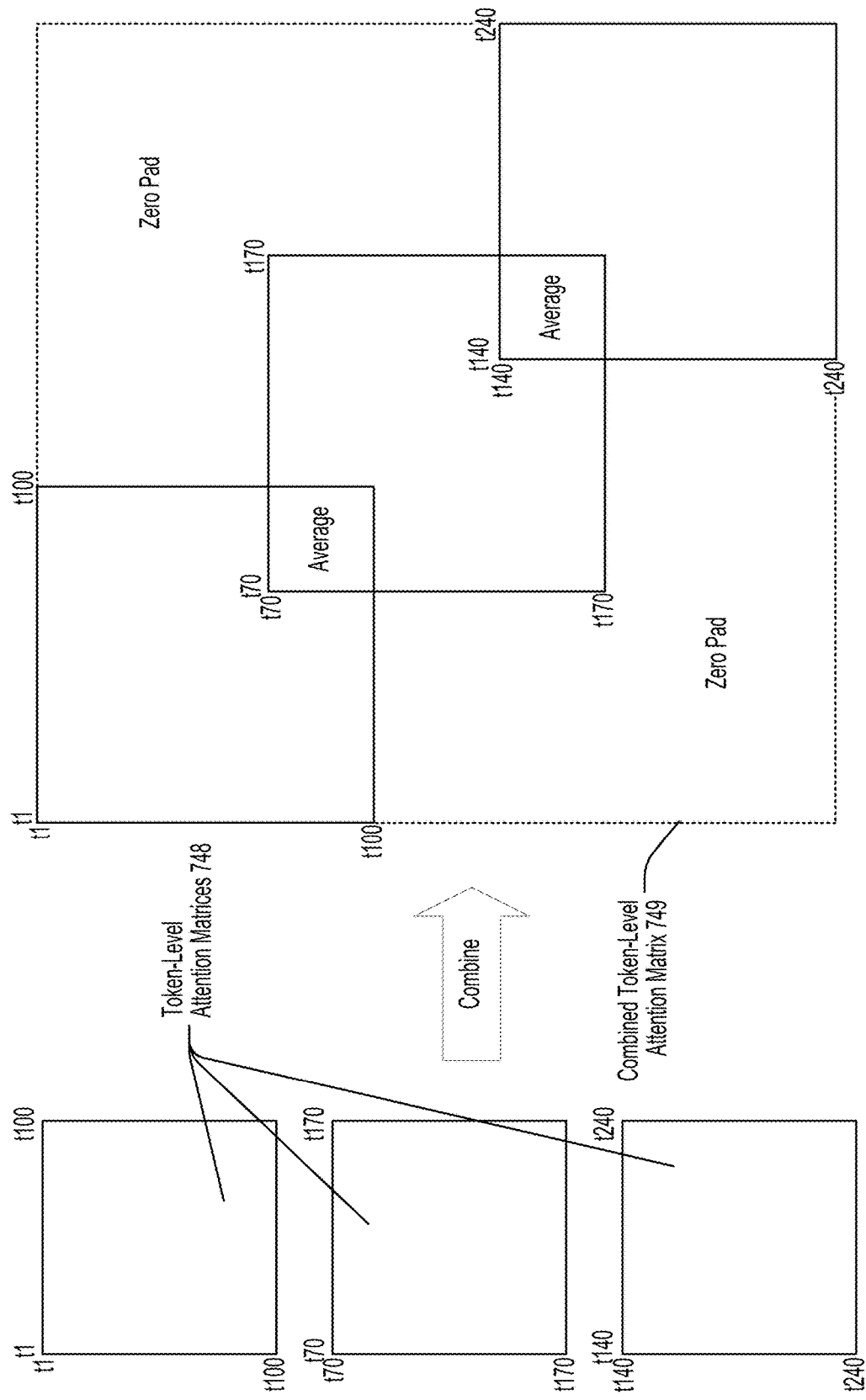
FIG. 7 illustrates an example of combining token-level attention matrices to form a combined token-level attention matrix.

FIG. 7 illustrates an example of combining token-level attention matrices 748 to form a combined token-level attention matrix 749, in accordance with some embodiments of the present disclosure. As described herein, the data preprocessor may divide the input text into multiple segments based on the maximum number of tokens that the transformed-based machine learning model can handle. Each of the segments may include a number of tokens equal to or less than the maximum number of tokens. In the illustrated example, the input text has 240 tokens and the maximum number of tokens that the transformed-based machine learning model can handle is 100. As such, the input text is divided into three segments that at least partially overlap including tokens t1-t100, t70-t170, and t140-t240, each of which are provided to the model to generate token-level attention matrices 748.

Combined token-level attention matrix 749 is formed by placing token-level attention matrices 748 diagonally such that the matrices overlap with each other in the diagonal direction at least partially. Each value of the overlapped portions of the matrices are averaged between the two values from the contributing matrices. Portions of combined token-level attention matrix 749 that do not have any contributing matrix from token-level attention matrices 748 are zero padded.

Figure 8:
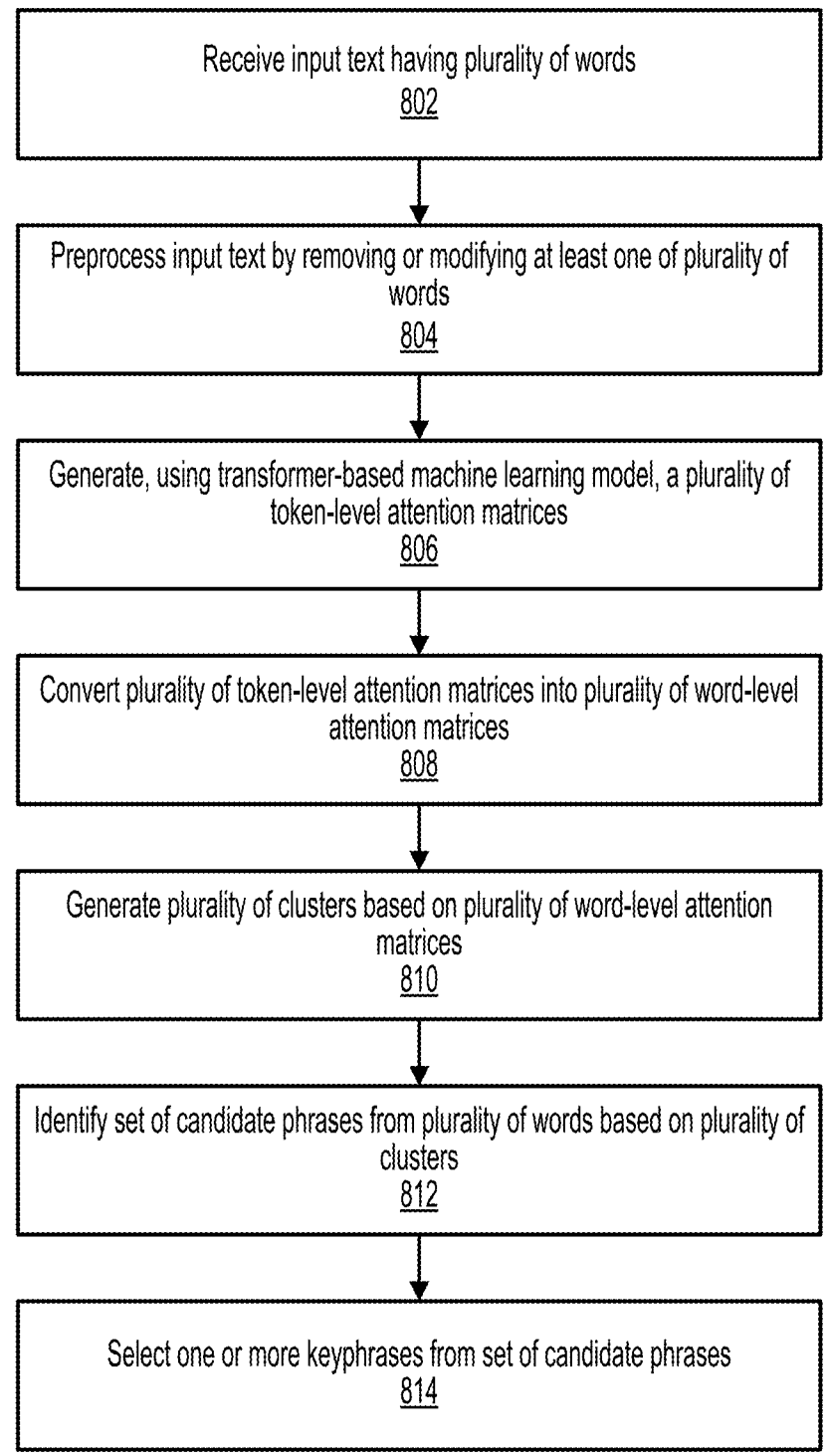
FIG. 8 illustrates an example method for extracting one or more keyphrases from an input text.

FIG. 8 illustrates an example method 800 for extracting one or more keyphrases from an input text, in accordance with some embodiments of the present disclosure. One or more steps of method 800 may be omitted during performance of method 800, and steps of method 800 may be performed in any order and/or in parallel. One or more steps of method 800 may be performed by one or more processors. Method 800 may be implemented as a computer-readable medium or computer program product comprising instructions which, when the program is executed by one or more computers, cause the one or more computers to carry out the steps of method 800.

At step 802, an input text (e.g., input texts 110, 210, 610) having a plurality of words (e.g., words 112, 612) is received. The input text may include different sections, and the plurality of words may be divided between the sections. The sections may include a title (e.g., titles 230, 630), a set of facets (e.g., facets 232, 632), a short description (e.g., short descriptions 234, 634), and/or a long description (e.g., long descriptions 236, 636). The input text may be received by a keyphrase extraction system (e.g., keyphrase extraction systems 100, 200).

At step 804, the input text is preprocessed by removing or modifying at least one of the plurality of words. In some embodiments, one or more sections of the input text may be removed. In some embodiments, each of the paragraphs of the long description may be compared to the short description to determine a similarity score for each paragraph, and paragraphs having similarity scores below a threshold may be removed. The input text may be preprocessed by a data preprocessor (e.g., data preprocessor 202) of the keyphrase extraction system.

At step 806, a plurality of token-level attention matrices (e.g., token-level attention matrices 448, 648, 748) are generated using a transformer-based machine learning model (e.g., transformer model 422) based on the plurality of words. The plurality of words may be provided to the transformer-based machine learning model as input. The plurality of token-level attention matrices may include (or otherwise indicate) context-based relationship values (e.g., context-based relationship values 662) between tokens in the plurality of words. The transformer-based machine learning model may be a BERT model.

At step 808, the plurality of token-level attention matrices are converted into a plurality of word-level attention matrices (e.g., word-level attention matrices 450, 650). The plurality of word-level attention matrices may include (or otherwise indicate) context-based relationship values (e.g., context-based relationship values 664) between the plurality of words. The plurality of token-level attention matrices may be converted into the plurality of word-level attention matrices by a matrix converter (e.g., matrix converter 452) of the keyphrase extraction system.

At step 810, a plurality of clusters (e.g., clusters 456, 656) are generated based on the plurality of word-level attention matrices. Each of the plurality of clusters may be generated based on the context-based relationship values between the plurality of words. Each of the plurality of clusters may include two or more words from the plurality of words. The plurality of clusters may be generated by determining which of the context-based relationship values between the plurality of words are greater than a threshold. The plurality of clusters may be generated by a cluster generator (e.g., cluster generator 454) of the keyphrase extraction system.

At step 812, a set of candidate phrases (e.g., candidate phrases 218, 418, 618) are identified from the plurality of words. The set of candidate phrases may be identified based on the plurality of clusters and/or the plurality of word-level attention matrices. Each of the set of candidate phrases may include one or more words from the plurality of words. The set of candidate phrases may be identified by a candidate phrase identifier (e.g., candidate phrase identifier 204, 404) of the keyphrase extraction system.

At step 814, one or more keyphrases (e.g., keyphrases 120, 220, 620) are selected from the set of candidate phrases. The one or more keyphrases may be selected based on a set of scores (e.g., scores 668) for the set of candidate phrases. In some embodiments, selecting the one or more keyphrases may include determining the set of scores for the set of candidate phrases based on the context-based relationship values between the plurality of words. The one or more keyphrases may be selected by a keyphrase selector (e.g., keyphrase selectors 206, 506) of the keyphrase extraction system. The one or more keyphrases may be selected using a ranking algorithm (e.g., ranking algorithm 566) that is executed by the keyphrase selector.

In some embodiments, method 800 may further include the step of training the transformer-based machine learning model. The transformer-based machine learning model may be trained using a set of training examples. The set of training examples may be domain-specific training examples. For example, the set of training examples may be genealogy training examples. In some embodiments, method 800 may further include the step of associating the plurality of words with the one or more keyphrases within a database. In some embodiments, method 800 may further include the step of retrieving the input text from the database based on a query using the one or more keyphrases.

Figure 9:
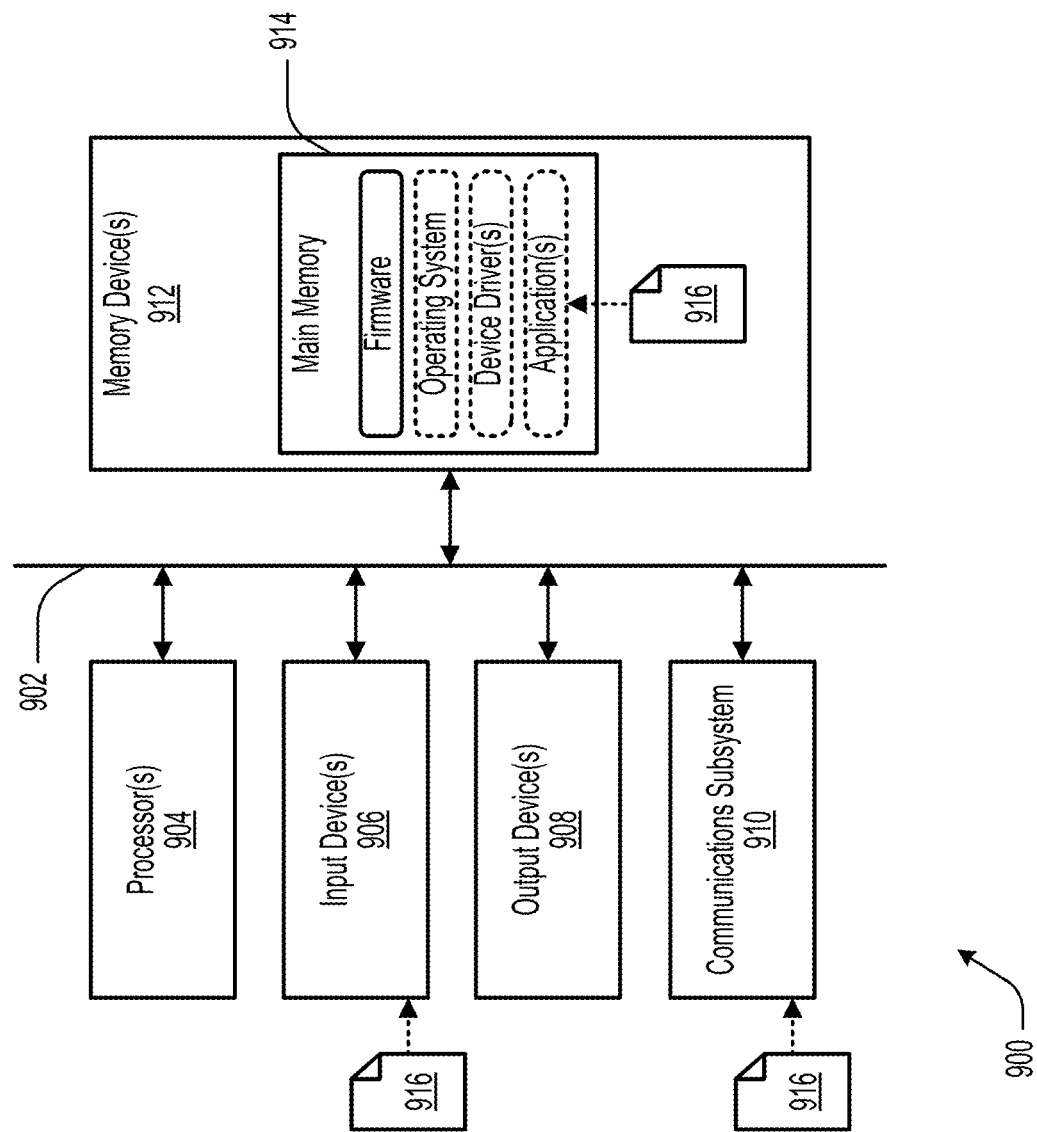
FIG. 9 illustrates an example computer system comprising various hardware elements.

FIG. 9 illustrates an example computer system 900 comprising various hardware elements, in accordance with some embodiments of the present disclosure. Computer system 900 may be incorporated into or integrated with devices described herein and/or may be configured to perform some or all of the steps of the methods provided by various embodiments. For example, in various embodiments, computer system 900 may be incorporated into keyphrase extraction systems 100 or 200 and/or may be configured to perform method 800. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

In the illustrated example, computer system 900 includes a communication medium 902, one or more processor(s) 904, one or more input device(s) 906, one or more output device(s) 908, a communications subsystem 910, and one or more memory device(s) 912. Computer system 900 may be implemented using various hardware implementations and embedded system technologies. For example, one or more elements of computer system 900 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 900 may be communicatively coupled via communication medium 902. While communication medium 902 is illustrated as a single connection for purposes of clarity, it should be understood that communication medium 902 may include various numbers and types of communication media for transferring data between hardware elements. For example, communication medium 902 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 902 may include one or more buses connecting pins of the hardware elements of computer system 900. For example, communication medium 902 may include a bus that connects processor(s) 904 with main memory 914, referred to as a system bus, and a bus that connects main memory 914 with input device(s) 906 or output device(s) 908, referred to as an expansion bus. The system bus may itself consist of several buses, including an address bus, a data bus, and a control bus. The address bus may carry a memory address from processor(s) 904 to the address bus circuitry associated with main memory 914 in order for the data bus to access and carry the data contained at the memory address back to processor(s) 904. The control bus may carry commands from processor(s) 904 and return status signals from main memory 914. Each bus may include multiple wires for carrying multiple bits of information and each bus may support serial or parallel transmission of data.

Processor(s) 904 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s)

904 may include one or more multi-core processors, in which each core may read and execute program instructions concurrently with the other cores, increasing speed for programs that support multithreading.

Input device(s) 906 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 906 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 908 may include one or more of various devices that convert information into human-readable form, such as without limitation a display device, a speaker, a printer, a haptic or tactile device, and/or the like. Output device(s) 908 may also include devices for writing to removable storage devices or other removable media, such as those described in reference to input device(s) 906. Output device(s) 908 may also include various actuators for causing physical movement of one or more components. Such actuators may be hydraulic, pneumatic, electric, and may be controlled using control signals generated by computer system 900.

Communications subsystem 910 may include hardware components for connecting computer system 900 to systems or devices that are located external to computer system 900, such as over a computer network. In various embodiments, communications subsystem 910 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 912 may include the various data storage devices of computer system 900. For example, memory device(s) 912 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 904 and memory device(s) 912 are illustrated as being separate elements, it should be understood that processor(s) 904 may include varying levels of on-processor memory, such as processor registers and caches that may be utilized by a single processor or shared between multiple processors.

Memory device(s) 912 may include main memory 914, which may be directly accessible by processor(s) 904 via the memory bus of communication medium 902. For example, processor(s) 904 may continuously read and execute instructions stored in main memory 914. As such, various software elements may be loaded into main memory 914 to be read and executed by processor(s) 904 as illustrated in FIG. 9. Typically, main memory 914 is volatile memory, which loses all data when power is turned off and accordingly needs power to preserve stored data. Main memory 914 may further include a small portion of non-volatile memory containing software (e.g., firmware, such as BIOS) that is used for reading other software stored in memory device(s) 912 into main memory 914. In some embodiments, the volatile memory of main memory 914 is implemented as RAM, such as dynamic random-access memory (DRAM), and the non-volatile memory of main memory 914 is implemented as read-only memory (ROM), such as flash memory, erasable programmable read-only memory (EPROM), or electrically erasable programmable read-only memory (EEPROM).

Computer system 900 may include software elements, shown as being currently located within main memory 914, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 916, which are executable by computer system 900. In one example, such instructions 916 may be received by computer system 900 using communications subsystem 910 (e.g., via a wireless or wired signal that carries instructions 916), carried by communication medium 902 to memory device(s) 912, stored within memory device(s) 912, read into main memory 914, and executed by processor(s) 904 to perform one or more steps of the described methods. In another example, instructions 916 may be received by computer system 900 using input device(s) 906 (e.g., via a reader for removable media), carried by communication medium 902 to memory device(s) 912, stored within memory device(s) 912, read into main memory 914, and executed by processor(s) 904 to perform one or more steps of the described methods.

In some embodiments of the present disclosure, instructions 916 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 900. For example, the non-transitory computer-readable medium may be one of memory device(s) 912 (as shown in FIG. 9). In some cases, the non-transitory computer-readable medium may be separate from computer system 900. In one example, the non-transitory computer-readable medium may be a removable medium provided to input device(s) 906 (as shown in FIG. 9), such as those described in reference to input device(s) 906, with instructions 916 being read into computer system 900 by input device(s) 906. In another example, the non-transitory computer-readable medium may be a component of a remote electronic device, such as a mobile phone, that may wirelessly transmit a data signal that carries instructions 916 to computer system 900 and that is received by communications subsystem 910 (as shown in FIG. 9).

Instructions 916 may take any suitable form to be read and/or executed by computer system 900. For example, instructions 916 may be source code (written in a human-readable programming language such as Java, C, C++, C#, Python), object code, assembly language, machine code, microcode, executable code, and/or the like. In one example, instructions 916 are provided to computer system 900 in the form of source code, and a compiler is used to translate instructions 916 from source code to machine code, which may then be read into main memory 914 for execution by processor(s) 904. As another example, instructions 916 are provided to computer system 900 in the form of an executable file with machine code that may immediately be read into main memory 914 for execution by processor(s) 904. In various examples, instructions 916 may be provided to computer system 900 in encrypted or unencrypted form, compressed or uncompressed form, as an installation package or an initialization for a broader software deployment, among other possibilities.

In one aspect of the present disclosure, a system (e.g., computer system 900) is provided to perform methods in accordance with various embodiments of the present disclosure. For example, some embodiments may include a system comprising one or more processors (e.g., processor(s) 904) that are communicatively coupled to a non-transitory computer-readable medium (e.g., memory device(s) 912 or main memory 914). The non-transitory computer-readable medium may have instructions (e.g., instructions 916) stored therein that, when executed by the one or more processors, cause the one or more processors to perform the methods described in the various embodiments.

In another aspect of the present disclosure, a computer-program product that includes instructions (e.g., instructions 916) is provided to perform methods in accordance with various embodiments of the present disclosure. The computer-program product may be tangibly embodied in a non-transitory computer-readable medium (e.g., memory device(s) 912 or main memory 914). The instructions may be configured to cause one or more processors (e.g., processor(s) 904) to perform the methods described in the various embodiments.

In another aspect of the present disclosure, a non-transitory computer-readable medium (e.g., memory device(s) 912 or main memory 914) is provided. The non-transitory computer-readable medium may have instructions (e.g., instructions 916) stored therein that, when executed by one or more processors (e.g., processor(s) 904), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for extracting one or more keyphrases from an input text, the computer-implemented method comprising:
   receiving the input text having a plurality of words;
   providing the plurality of words to a transformer-based machine learning model;
   generating, using the transformer-based machine learning model, a plurality of token-level attention matrices that indicate token-level context-based relationship values between tokens in the plurality of words;
   converting the plurality of token-level attention matrices into a plurality of word-level attention matrices that indicate word-level context-based relationship values between the plurality of words;
   identifying, according to the word-level context-based relationship values defined by the plurality of word-level attention matrices, a set of candidate phrases from the plurality of words, wherein each of the set of candidate phrases includes one or more words from the plurality of words; and
   selecting the one or more keyphrases from the set of candidate phrases by:
      sorting the set of candidate phrases according to first token positions within the set of candidate phrases;
      determining, based on sorting the set of candidate phrases, an amount of candidate phrase overlap between a first candidate phrase and a second candidate phrase among the set of candidate phrases; and
      generating a keyphrase score by combining a first score for the first candidate phrase with a second score for the second candidate phrase according to the amount of candidate phrase overlap.

2. The computer-implemented method of claim 1, further comprising:
generating a plurality of clusters based on the plurality of word-level attention matrices, wherein each of the plurality of clusters is generated based on the word-level context-based relationship values, and wherein the set of candidate phrases are identified based on the plurality of clusters.

3. The computer-implemented method of claim 2, wherein the plurality of clusters are generated by determining which of the word-level context-based relationship values are greater than a threshold.

4. The computer-implemented method of claim 1, further comprising:
preprocessing the input text by dividing the plurality of words into a plurality of segments, wherein each of the plurality of segments is separately provided to the transformer-based machine learning model.

5. The computer-implemented method of claim 1, wherein the transformer-based machine learning model includes a plurality of heads, wherein each of the plurality of heads (i) includes a set of attention weights and (ii) generates one of the plurality of token-level attention matrices.

6. The computer-implemented method of claim 1, further comprising:
determining that the amount of candidate phrase overlap satisfies an overlap threshold; and
combining the first candidate phrase and the second candidate phrase based on determining that the amount of candidate phrase overlap satisfies the overlap threshold.

7. The computer-implemented method of claim 1, further comprising:
utilizing a duplicate detector to detect that a third candidate phrase is a duplicate of the first candidate phrase; and
based on detecting that the third candidate phrase is a duplicate of the first candidate phrase:
increasing the keyphrase score associated with the first candidate phrase; and
removing the third candidate phrase from the set of candidate phrases.

8. A non-transitory computer-readable medium comprising instructions that, when executed by one or more processors, cause the one or more processors to perform operations comprising:
receiving an input text having a plurality of words;
providing the plurality of words to a transformer-based machine learning model;
generating, using the transformer-based machine learning model, a plurality of token-level attention matrices that indicate token-level context-based relationship values between tokens in the plurality of words;
converting the plurality of token-level attention matrices into a plurality of word-level attention matrices that indicate word-level context-based relationship values between the plurality of words;
identifying, according to the word-level context-based relationship values defined by the plurality of word-level attention matrices, a set of candidate phrases from the plurality of words, wherein each of the set of candidate phrases includes one or more words from the plurality of words; and
selecting one or more keyphrases from the set of candidate phrases by:
sorting the set of candidate phrases according to first token positions within the set of candidate phrases;
determining, based on sorting the set of candidate phrases, an amount of candidate phrase overlap between a first candidate phrase and a second candidate phrase among the set of candidate phrases; and
generating a keyphrase score by combining a first score for the first candidate phrase with a second score for the second candidate phrase according to the amount of candidate phrase overlap.

9. The non-transitory computer-readable medium of claim 8, wherein the operations further comprise:
generating a plurality of clusters based on the plurality of word-level attention matrices, wherein each of the plurality of clusters is generated based on the word-level context-based relationship values, and wherein the set of candidate phrases are identified based on the plurality of clusters.

10. The non-transitory computer-readable medium of claim 9, wherein the plurality of clusters are generated by determining which of the word-level context-based relationship values are greater than a threshold.

11. The non-transitory computer-readable medium of claim 8, further comprising:
preprocessing the input text by dividing the plurality of words into a plurality of segments, wherein each of the plurality of segments is separately provided to the transformer-based machine learning model.

12. The non-transitory computer-readable medium of claim 8, wherein the transformer-based machine learning model includes a plurality of heads, wherein each of the plurality of heads (i) includes a set of attention weights and (ii) generates one of the plurality of token-level attention matrices.

13. The non-transitory computer-readable medium of claim 8, wherein the transformer-based machine learning model is a Bidirectional Encoder Representations from Transformers (BERT) model.

14. The non-transitory computer-readable medium of claim 8, wherein selecting the one or more keyphrases from the set of candidate phrases includes:
determining a set of scores for the set of candidate phrases based on the word-level context-based relationship values between the plurality of words.

15. A system comprising,
one or more processors; and
a non-transitory computer-readable medium comprising instructions that, when executed by the one or more processors, cause the one or more processors to perform operations comprising:
receiving an input text having a plurality of words;
providing the plurality of words to a transformer-based machine learning model;
generating, using the transformer-based machine learning model, a plurality of token-level attention matrices that indicate token-level context-based relationship values between tokens in the plurality of words;
converting the plurality of token-level attention matrices into a plurality of word-level attention matrices that indicate word-level context-based relationship values between the plurality of words;
identifying, according to the word-level context-based relationship values defined by the plurality of word-level attention matrices, a set of candidate phrases from the plurality of words, wherein each of the set of candidate phrases includes one or more words from the plurality of words; and selecting one or more keyphrases from the set of candidate phrases by:

sorting the set of candidate phrases according to first token positions within the set of candidate phrases;

determining, based on sorting the set of candidate phrases, an amount of candidate phrase overlap between a first candidate phrase and a second candidate phrase among the set of candidate phrases; and generating a keyphrase score by combining a first score for the first candidate phrase with a second score for the second candidate phrase according to the amount of candidate phrase overlap.

16. The system of claim 15, wherein the operations further comprise:

generating a plurality of clusters based on the plurality of word-level attention matrices, wherein each of the plurality of clusters is generated based on the word-level context-based relationship values, and wherein the set of candidate phrases are identified based on the plurality of clusters.

17. The system of claim 16, wherein the plurality of clusters are generated by determining which of the word-level context-based relationship values are greater than a threshold.

18. The system of claim 15, further comprising:

preprocessing the input text by dividing the plurality of words into a plurality of segments, wherein each of the plurality of segments is separately provided to the transformer-based machine learning model.

19. The system of claim 15, wherein the transformer-based machine learning model includes a plurality of heads, wherein each of the plurality of heads (i) includes a set of attention weights and (ii) generates one of the plurality of token-level attention matrices.

20. The system of claim 15, wherein selecting the one or more keyphrases from the set of candidate phrases includes:

determining a set of scores for the set of candidate phrases based on the word-level context-based relationship values between the plurality of words.

* * * * *